United States Patent
Ando

(10) Patent No.: US 9,382,069 B2
(45) Date of Patent: Jul. 5, 2016

(54) FIXING DEVICE AND IMAGE FORMING APPARATUS

(71) Applicant: Samsung Electronics Co., Ltd., Suwon-si (KR)

(72) Inventor: Takashi Ando, Yokohama (JP)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 80 days.

(21) Appl. No.: 14/088,818

(22) Filed: Nov. 25, 2013

(65) Prior Publication Data

US 2014/0166445 A1 Jun. 19, 2014

(30) Foreign Application Priority Data

Dec. 18, 2012 (JP) .................................. 2012-275564
Apr. 19, 2013 (KR) ......................... 10-2013-0043813

(51) Int. Cl.
*B65G 15/62* (2006.01)
*G03G 15/20* (2006.01)

(52) U.S. Cl.
CPC ............ *B65G 15/62* (2013.01); *G03G 15/2053* (2013.01); *G03G 2215/2035* (2013.01)

(58) Field of Classification Search
CPC ...................................................... B65G 15/62
USPC ........................................................ 399/324
See application file for complete search history.

(56) References Cited

U.S. PATENT DOCUMENTS

| | | | | |
|---|---|---|---|---|
| 7,302,219 B2* | 11/2007 | Watanabe | .......... | G03G 15/2025 399/327 |
| 7,330,688 B2* | 2/2008 | Watanabe | .......... | G03G 15/2064 219/216 |
| 9,020,408 B2* | 4/2015 | Suzuki | ............... | G03G 15/2053 399/329 |
| 2003/0016971 A1* | 1/2003 | Kikuchi | ............. | G03G 15/2028 399/323 |
| 2006/0093416 A1* | 5/2006 | Watanabe | .......... | G03G 15/2053 399/329 |
| 2011/0129267 A1* | 6/2011 | Arimoto | ............ | G03G 15/2053 399/329 |
| 2011/0158671 A1* | 6/2011 | Nishiyama | ......... | G03G 15/2039 399/69 |
| 2011/0188907 A1* | 8/2011 | Seki | ....................... | G03G 15/20 399/329 |
| 2011/0280634 A1* | 11/2011 | Yoshimura | .......... | G03G 15/2028 399/323 |
| 2011/0318073 A1* | 12/2011 | Arikawa | ............ | G03G 15/2032 399/329 |
| 2012/0121304 A1* | 5/2012 | Tokuda | .............. | G03G 15/2039 399/329 |
| 2012/0148317 A1* | 6/2012 | Samei | ................. | G03G 15/2053 399/328 |
| 2012/0155932 A1* | 6/2012 | Nakamura | ......... | G03G 15/2017 399/329 |
| 2012/0328323 A1* | 12/2012 | Murooka | ........... | G03G 15/2042 399/92 |
| 2013/0051876 A1* | 2/2013 | Ishigaya | ............ | G03G 15/2053 399/329 |
| 2013/0084102 A1* | 4/2013 | Fukuda | .............. | G03G 15/2053 399/122 |

FOREIGN PATENT DOCUMENTS

JP 2012-145681 8/2012

* cited by examiner

*Primary Examiner* — Thomas Randazzo
(74) *Attorney, Agent, or Firm* — Staas & Halsey LLP

(57) ABSTRACT

First and second frame parts 400a and 400b support a belt guide 431 by interposing the belt guide 431 therebetween. The first frame part 400a is disposed at a downstream side of in rotation direction of a pressure roller 44 than the second frame part 400b when seeing it in a direction parallel to a rotation axis of the pressure roller 44. A convex-shaped first belt guide support part 401a for supporting the belt guide 431 is provided on a surface of the first frame part 400a, which faces the second frame part 400b. A convex-shaped second belt guide support part 401b for supporting the belt guide 431 is provided on a surface of the second frame part 400b, which faces the first frame part 400a, at a position, which is more separated from the pressure roller 44 than the first belt guide support part 401a.

11 Claims, 6 Drawing Sheets

FIXING DEVICE AND IMAGE FORMING APPARATUS

CROSS-REFERENCE TO RELATED APPLICATIONS

This application claims the priority benefit of Japanese Patent Application No. 2012-275564, filed on Dec. 18, 2012, in the Japanese Patent Office and Korean Patent Application No. 10-2013-0043813, filed on Apr. 19, 2013, in the Korean Intellectual Property Office, the disclosures of which are incorporated herein in their entirety by reference.

BACKGROUND

1. Field

Embodiments relate to a fixing device for fixing a toner image formed on a recording medium and an image forming apparatus having the same.

2. Description of the Related Art

Conventionally, a fixing device includes an outer circumferential surface of a pressure roller, an endless-shaped fixing belt having flexibility, and a pressure-contacting member disposed to face the pressing roller by interposing the fixing belt therebetween. In the fixing device, a recording medium is fed between the fixing belt and the pressure roller, and a toner image formed on the recording medium is fixed by inserting the recording medium between the pressure-contacting member and the pressure roller and heating and pressing the recording medium.

In addition, as such a fixing device, a fixing device wherein a pressure roller is fixed to a frame of the fixing device and a pressure-contacting member pressure-contacts the pressure roller by interposing a fixing belt therebetween also has been proposed.

(Patent Document 1) JP 2002-145681 A

In the fixing device wherein the pressure-contacting member pressure-contacts the pressure roller, a belt guide rotatably supporting the fixing belt at both ends of the fixing belt is provided. In addition, the belt guide is supported by the frame of the fixing device. If there is a wobble between the belt guide and the frame, when the fixing device operates, the belt guide leans as much as the wobble, thereby resulting in a defect, such as an increase in a skewing force acting on the fixing belt in an axis direction. In addition, if the wobble is reduced, since a gap between the belt guide and the frame is also reduced, the assembly performance of the belt guide may be degraded, or a smooth operation of the belt guide in an operation of the fixing device is obstructed, thereby resulting in a pressure unbalance in a nip surface.

SUMMARY

In an aspect of one or more embodiments, there is provided a fixing device capable of supporting a belt guide on a frame in a stable state and an image forming apparatus adopting the same.

According to an aspect of one or more embodiments, there is provided a fixing device including: a pressure roller; an endless-shaped fixing belt having flexibility; a pressure-contacting member for pressure-contacting the pressure roller by interposing the fixing belt therebetween; a belt guide for rotatably supporting the fixing belt and simultaneously supporting the pressure-contacting member; and first and second frames for supporting the belt guide by interposing the belt guide therebetween. The first and second frames slidably support the belt guide in a direction where the pressure-contacting member pressure-contacts the pressure roller. The first frame is disposed at a downstream side in a rotation direction of the pressure roller than the second frame when seeing it in a direction parallel to a rotation axis of the pressure roller. A convex-shaped first belt guide support part for supporting the belt guide is provided on a surface of the first frame, which faces the second frame. A convex-shaped second belt guide support part for supporting the belt guide is provided on a surface of the second frame, which faces the first frame, at a position, which is more separated from the pressure roller than the first belt guide support part.

The fixing device may further include a pressure member for pressing the belt guide so that pressure-contacting member pressure-contacts the pressure roller, wherein the pressure member presses the belt guide by a roller having a rotation axis that is parallel to the rotation axis of the pressure roller.

The roller may be mounted at an upstream side in the rotation direction of the pressure roller based on a central line of a width of the belt guide in a direction that is orthogonal to a sliding direction of the belt guide when seeing it in a direction parallel to the rotation axis of the pressure roller.

According to an aspect of one or more embodiments, there is provided a fixing device including: a pressure roller; a fixing belt; a pressure-contacting member for pressure-contacting the pressure roller by interposing the fixing belt therebetween; a belt guide for rotatably supporting both ends of the fixing belt and simultaneously supporting the pressure-contacting member; first and second frame parts, which are respectively located at a downstream side and an upstream side based on a rotation direction of the pressure roller, face each other, and support the belt guide therebetween to be slidable towards the pressure roller; and a pressure member for providing a pressure force to the belt guide in a direction where the pressure-contacting member pressure-contacts the pressure roller, wherein the pressure member provides the pressure force to a position biased towards the second frame part based on a central line passing through the center of a width of the pressure-contacting member.

Convex-shaped first and second belt guide support parts for supporting the belt guide may be provided on surfaces of the first and second frame parts, which face each other.

The first and second belt guide support parts may have different separation distances from the pressure roller.

The first belt guide support part may be closer to the pressure roller than the second belt guide support part.

The pressure member may have a roller having a rotation axis that is parallel to a rotation axis of the pressure roller, and the roller may contact and press the belt guide.

In an aspect of one or more embodiments, there is provided an image forming apparatus having the fixing device.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
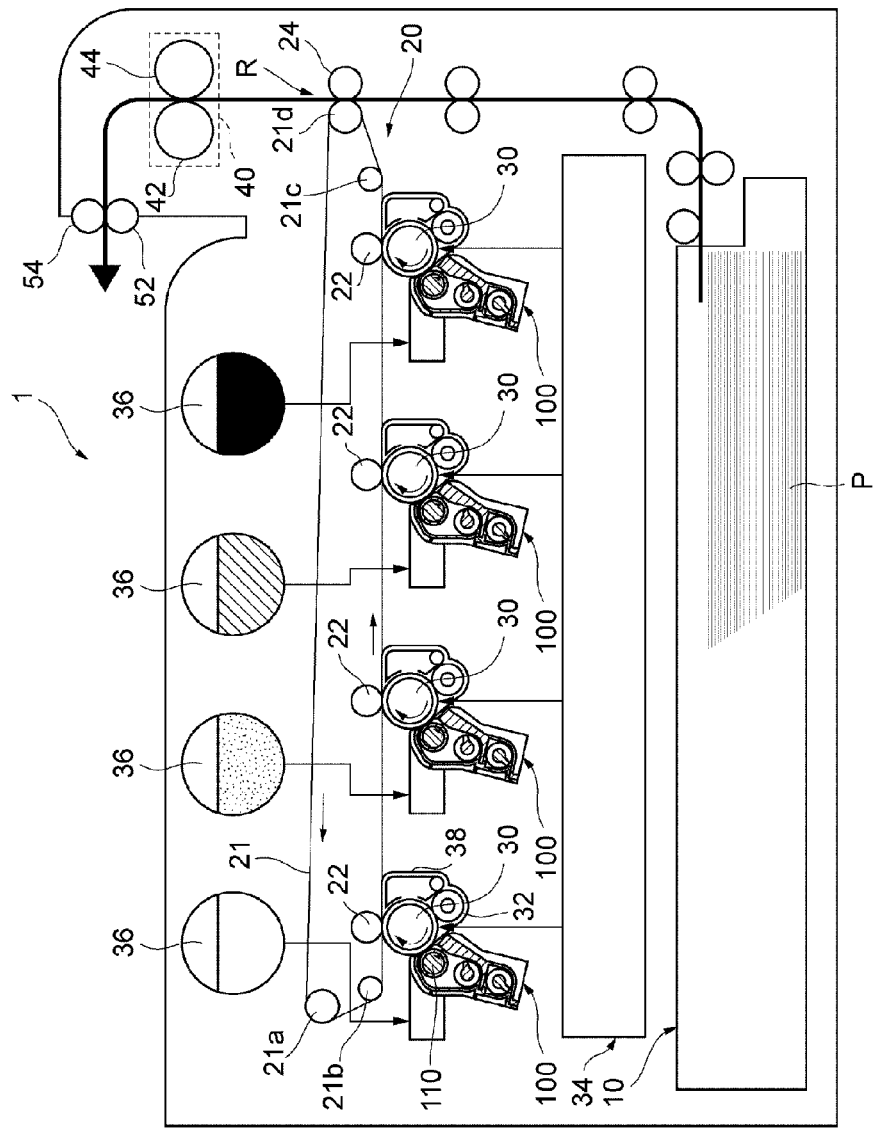
FIG. 1 is a schematic configuration of an image forming apparatus according to an embodiment.

Reference will now be made in detail to embodiments, examples of which are illustrated in the accompanying drawings, wherein like reference numerals refer to the like elements throughout.

In addition, for components having substantially the same function in the specification and the drawings, a description thereof is omitted by assigning the same reference numeral to the components.

(Overall Configuration of Image Forming Apparatus)

As shown in FIG. 1, an image forming apparatus 1 may include a recording medium feeding unit 10, a transfer unit 20, four photosensitive body drums 30, four developing units 100, and a fixing unit (fixing device) 40.

The recording medium feeding unit 10 accommodates sheets of paper P as recording media on which an image is finally formed and simultaneously feeds each sheet of paper P to a recording medium feeding path. The sheets of paper P are stacked and accommodated in a cassette. The recording medium feeding unit 10 feeds a sheet of paper P so that the sheet of paper P arrives at a secondary transfer area R in time a toner image to be transferred to the sheet of paper P arrives at the secondary transfer area R.

The transfer unit 20 carries the toner image formed by the four developing units 100 to the secondary transfer area R in which the toner image is secondary-transferred onto the sheet of paper P. The transfer unit 20 may include a transfer belt 21, four suspension rollers 21a, 21b, 21c, and 21d suspending the transfer belt 21, four primary transfer rollers 22 opposing the four photosensitive body drums 30 and interposing the transfer belt 21 therebetween, and a secondary transfer roller 24 opposing the suspension roller 21d and interposing the transfer belt 21 therebetween.

The transfer belt 21 is an endless-shaped belt circulatively moving by the four suspension rollers 21a, 21b, 21c, and 21d. The four primary transfer rollers 22 press the four photosensitive body drums 30 from an inner circumferential side of the transfer belt 21. The secondary transfer roller 24 press the suspension roller 21d from an outer circumferential side of the transfer belt 21. In addition, the transfer unit 20 may further include a belt cleaning device for removing a toner attached to the transfer belt 21.

Each of the four photosensitive body drums 30 is an electrostatic latent image bearing body, an image being formed on an outer circumferential surface thereof, and for example, an organic photo conductor (OPC) may be employed as a photosensitive body. The image forming apparatus according to the current embodiment is an apparatus capable of forming a color image, wherein the four photosensitive body drums 30 respectively corresponding to, for example, magenta, yellow, cyan, and black are arranged along a moving direction of the transfer belt 21. Along an outer circumference of each of the four photosensitive body drums 30, a charge roller 32, a light-exposure unit 34, a developing unit 100, and a cleaning unit 38 are provided as shown in FIG. 1.

The charge roller 32 uniformly charges the surface of the photosensitive body drum 30 at a predetermined potential. The light-exposure unit 34 exposes the surface of the photosensitive body drum 30, which is charged by the charge roller 32, to light according to an image to be formed on a sheet of paper P. Accordingly, a potential of a portion light-exposed by the light-exposure unit 34 on the surface of the photosensitive body drum 30 is changed, thereby forming an electrostatic latent image. Each of the four developing units 100 generates a toner image by developing the electrostatic latent image formed on the photosensitive body drum 30 by using toner supplied from a toner tank 36 corresponding to the developing unit 100. Toners of magenta, yellow, cyan, and black are filled in the four toner tanks 36, respectively.

The cleaning unit 38 collects toner remaining on the photosensitive body drum 30 after the toner image formed on the photosensitive body drum 30 is primary-transferred to the transfer belt 21. The cleaning unit 38 may have, for example, a structure of peeling residual toner on the photosensitive body drum 30 by contacting a cleaning blade with an outer circumferential surface of the photosensitive body drum 30. In addition, an eraser lamp for resetting the potential of the photosensitive body drum 30 may be disposed around the photosensitive body drum 30 between the cleaning unit 38 and the charge roller 32 in a rotation direction of the photosensitive body drum 30.

The fixing unit 40 attaches and fixes the toner image, which has been secondary-transferred from the transfer belt 21 to the sheet of paper P, to the sheet of paper P. The fixing unit 40 may include a heated fixing belt 42 and a pressure roller 44. The fixing belt 42 is an endless-shaped belt having flexibility. A heater 450 (refer to FIG. 4), e.g., a halogen lamp or the like, is installed inside the fixing belt 42. In addition, a pressure-contacting member 440 (refer to FIG. 4) is provided inside the fixing belt 42. The pressure-contacting member 440 pressure-contacts the pressure roller 44 by interposing the fixing belt 42 therebetween. The pressure roller 44 is a cylindrical-shaped member rotatable around a rotation axis thereof. A heat-resistant elastic layer, e.g., silicon, rubber, or the like, is provided on an outer circumferential surface of the pressure roller 44. The toner image is melted and fixed to the sheet of paper P by passing the sheet of paper P through a fixing nip portion that is a contact area between the fixing belt 42 and the pressure roller 44.

The image forming apparatus 1 may further include discharge rollers 52 and 54 for discharging the sheet of paper P to which the toner image has been fixed by the fixing unit 40.

An operation of the image forming apparatus 1 will now be described. When an image signal for an image to be recorded is input to the image forming apparatus 1, a control unit (not shown) of the image forming apparatus 1 uniformly charges the surfaces of the four photosensitive body drums 30 at a predetermined potential by using the charge roller 32 and then forms a static latent image by irradiating laser beams on the surfaces of the four photosensitive body drums 30 by using the light-exposure unit 34 based on the received image signal.

The developing unit 100 sufficiently charges toner by mixing and stirring the toner and a carrier and then a developer in which the toner and the carrier are mixed is attached to a developing roller (developer bearing body) 110. Thereafter, when the developer is fed by the rotation of the developing roller 110 to an area in which the developing roller 110 and the photosensitive body drum 30 face each other, the toner of the developer attached to the developing roller 110 moves to the electrostatic latent image formed on the outer circumferential surface of the photosensitive body drum 30 to thereby develop the electrostatic latent image. The toner image formed according to this is primary-transferred from the photosensitive body drum 30 to the transfer belt 21 in an area in which the photosensitive body drum 30 and the transfer belt 21 face each other. The toner images formed on the four photosensitive body drums 30 are sequentially stacked on the transfer belt 21 to thereby form one stacked toner image. The stacked toner image is secondary-transferred to the sheet of paper P fed from the recording medium feeding unit 10 in the secondary transfer area R in which the suspension roller 21*d* and the secondary transfer roller 24 face each other.

The sheet of paper P to which the stacked toner image has been secondary-transferred is fed to the fixing unit 40. The stacked toner image is melted and fixed to the sheet of paper P by passing the sheet of paper P between the fixing belt 42 and the pressure roller 44 with heat and pressure. Thereafter, the sheet of paper P is discharged to the outside of the image forming apparatus 1 by the discharge rollers 52 and 54. In case a belt cleaning device is provided, the toner remaining on the transfer belt 21 after the stacked toner image is secondary-transferred to the sheet of paper P may be removed by the belt cleaning device.

(Configuration of Fixing Unit)

Figure 2:
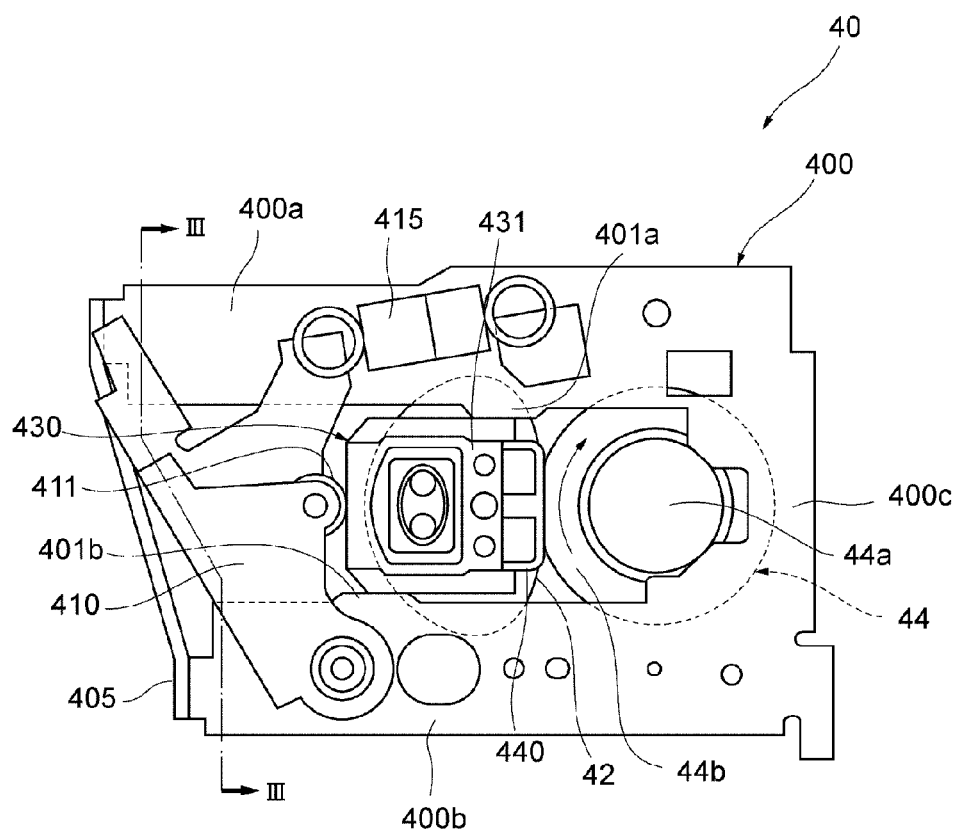
FIG. 2 is a front view of a fixing unit in the image forming apparatus of FIG. 1 when seeing it in a direction that is parallel to a rotation axis of a pressure roller.
Figure 3:
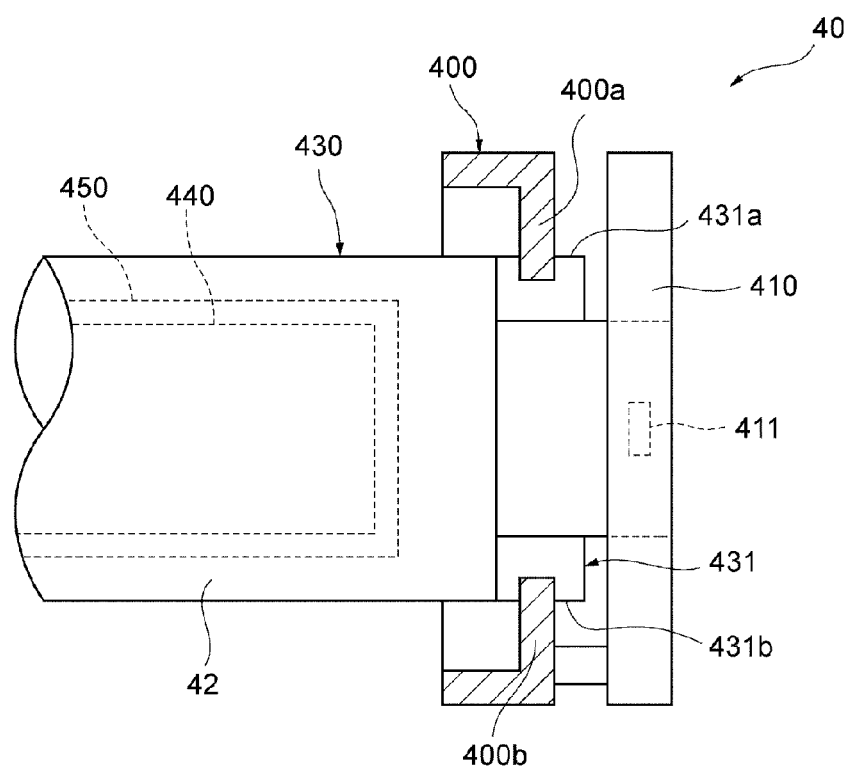
FIG. 3 is a cross-sectional view along line III-III of FIG. 2.

As shown in FIGS. 2 and 3, the fixing unit 40 may include the pressure roller 44, a belt assembly 430, a fixing unit frame 400, a pressure lever (pressure member) 410, and a pressure spring 415. The belt assembly 430 may include the fixing belt 42, a pressure-contacting member 440, a heater 450, and a belt guide 431. The belt guide 431 is disposed at both ends of the fixing belt 42 and rotatably supports the fixing belt 42. In addition, the belt guide 431 supports both ends of each of the pressure-contacting member 440 and the heater 450. The pressure-contacting member 440 and the heater 450 are disposed in the inner side of the fixing belt 42. The pressure-contacting member 440 pressure-contacts the pressure roller 44 by interposing the fixing belt 42 therebetween. The heater 450 heats the fixing belt 42 from the inner side of the fixing belt 42.

The fixing unit frame 400 is disposed both ends of each of the pressure roller 44 and the belt assembly 430. The fixing unit frame 400 has an about U shape. The fixing unit frame 400 includes first and second frame parts 400*a* and 400*b*, which extend approximately in parallel, and a frame connection part 400*c* connecting one ends of the first and second frame parts 400*a* and 400*b*. The frame connection part 400*c* supports an end of the pressure roller 44.

The pressure roller 44 includes an axis part 44*a* supported by the frame connection part 400*c* and a pressure surface part 44*b* rotatably supported by the axis part 44*a*. The pressure surface part 44*b* is driven to rotate by a driving source that is not shown.

The belt guide 431 of the belt assembly 430 is disposed between the first and second frame parts 400*a* and 400*b*. The first and second frame parts 400*a* and 400*b* rotatably support the belt guide 431 to be slidable in a direction where the pressure-contacting member 440 pressure-contacts the pressure roller 44. In addition, as shown in FIG. 3, the belt guide 431 includes a first engagement part 431*a* of an about U shape at a portion supported by the first frame part 400*a* and a second engagement part 431*b* of an about U shape at a portion supported by the second frame part 400*b*. Both surfaces of the first frame part 400*a* in an axis direction of the fixing belt 42 are inserted into and supported by the first engagement part 431*a* of an about U shape. Likewise, both surfaces of the second frame part 400*b* in the axis direction of the fixing belt 42 are inserted into and supported by the second engagement part 431*b* of an about U shape.

In addition, the first and second frame parts 400*a* and 400*b* are inserted into the first and second engagement part 431*a* and 431*b* so that the belt guide 431 is slidable in the direction where pressure-contacting member 440 pressure-contacts the pressure roller 44. By doing as so, wobble of the belt guide 431 in a rotation axis direction of the fixing belt 42 is restricted. In addition, in FIG. 2, to show a portion of the first frame part 400*a* towards the belt guide 431 and a portion of the second frame part 400*b* towards the belt guide 431, protruding portions of the about U shapes of the first and second engagement part 431*a* and 431*b* are omitted.

Herein, it is assumed that the pressure roller 44 rotates clockwise (in a right direction) in FIG. 2. Thus, the first frame part 400*a* is disposed at a downstream side of the second frame part 400*b* in the rotation direction of the pressure roller when seeing it in a direction that is parallel to the rotation axis of the pressure roller 44.

A convex-shaped first belt guide support part 401*a* for supporting the belt guide 431 is provided on a surface of the first frame part 400*a*, which faces the second frame part 400*b*. In addition, a convex-shaped second belt guide support part 401*b* for supporting the belt guide 431 at a position that is more separated from the pressure roller 44 than the first belt guide support part 401*a* is provided on a surface of the second frame part 400*b*, which faces the first frame part 400*a*. That is, the first belt guide support part 401*a* and the second belt guide support part 401*b* have different separation distances from the pressure roller 44.

The pressure lever 410 is mounted to cross the first frame part 400*a* and the second frame part 400*b* near an open end part of an about U shape thereof. One end of the pressure lever 410 is rotatably supported by the second frame part 400*b*. The other end of the pressure lever 410 is connected to a pressure spring 415 mounted on the first frame part 400*a*. By a force of the pressure spring 415, the pressure lever 410 presses the belt guide 431 towards the pressure roller 44. Accordingly, the pressure-contacting member 440 supported by the belt guide 431 pressure-contacts the pressure roller 44 by interposing the fixing belt 42 therebetween.

A roller 411 is mounted on a part of the pressure lever 410, which contacts the belt guide 431. That is, the pressure lever 410 presses the belt guide 431 by the roller 411. A rotation axis of the roller 411 is parallel to the rotation axis of the pressure roller 44.

A sub-frame 405 is mounted over the first frame part 400*a* and the second frame part 400*b* near an open part of the about U shape of the fixing unit frame 400. By mounting the sub-frame 405 on the fixing unit frame 400, the strength of the fixing unit frame 400 is enhanced.

Figure 4:
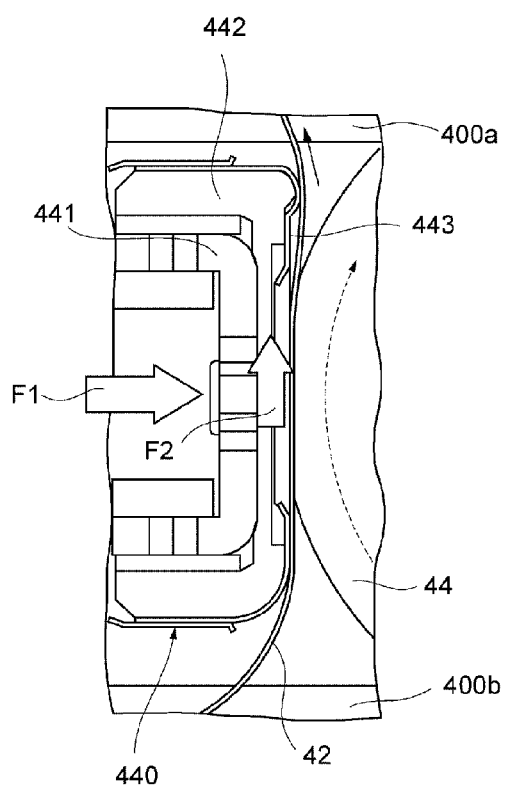
FIG. 4 is a front view of a contacting portion between a pressure-contacting member and a pressure roller in the fixing unit of FIG. 2.

A force applied to the belt guide 431 when the fixing unit 40 operates will now be described. As shown in FIG. 4, the pressure-contacting member 440 includes a structure member 441, a heat insulation member 442, and a nip plate 443 at a part pressure-contacting the pressure roller 44. The structure member 441 is fixed to the belt guide 431 and receives a pressure force from the pressure lever 410. The heat insulation member 442 is disposed on a surface of the structure member 441 towards the pressure roller 44. The nip plate 443 is disposed on a surface of the heat insulation member 442 towards the pressure roller 44. That is, the structure member 441, the heat insulation member 442, and the nip plate 443 have fixed locations with respect to the belt guide 431.

When the fixing unit operates, the pressure roller 44 rotates. The belt guide 431 is pressed towards the pressure roller 44 by the pressure lever 410, and accordingly, the nip plate 443 fixed to the belt guide 431 pressure-contacts the pressure roller 44 by interposing the fixing belt therebetween. A force applied to the pressure-contacting member 440 from the pressure lever 410 (a force of the pressure-contacting member 440 pressing the fixing belt 42) is referred to as a pressure force F1.

The nip plate 443 pressure-contacts the pressure roller 44 by interposing the fixing belt 42, and accordingly, the fixing belt 42 also rotates along the rotation of the pressure roller 44. At this time, the nip plate 443 fixed to the belt guide 431 sliding-contacts the rotating fixing belt 42. Due to this, a force for moving with the fixing belt 42 is applied to the pressure-contacting member 440. If it is assumed that a frictional coefficient between the nip plate 443 and the fixing belt 42 is $\mu$, a force F2 applied to the pressure-contacting member 440 according to the rotation of the pressure roller 44 (hereinafter, referred to as "sliding force") is represented by $F2=F1\times\mu$.

The sliding force F2 is a force in a moving direction of the fixing belt 42, i.e., a force in an upward direction in FIG. 4.

Figure 5:
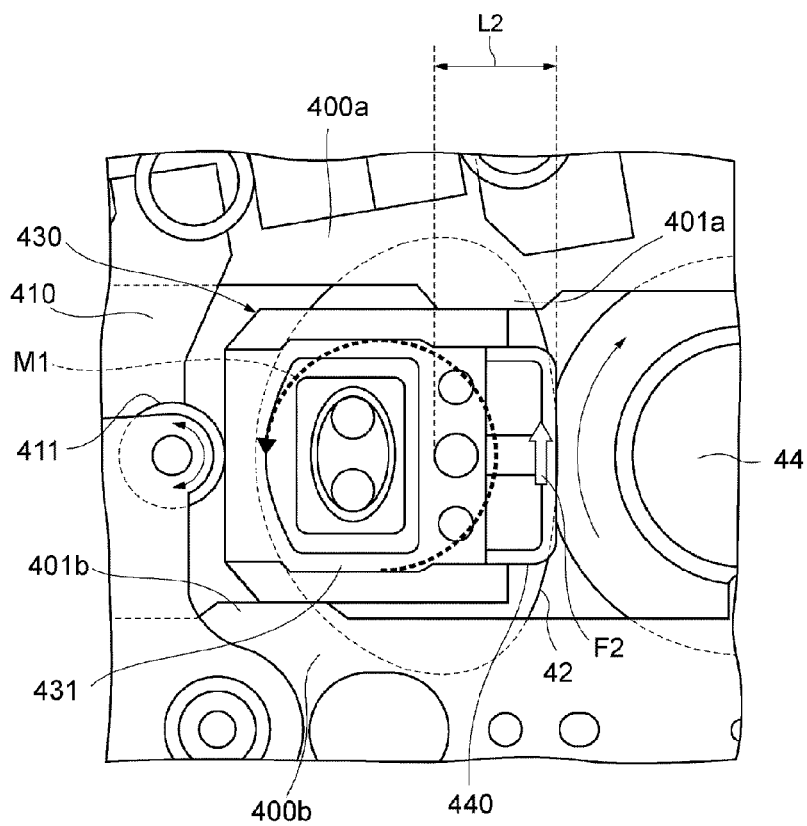
FIG. 5 is a partial front view of the fixing unit of FIG. 2 to describe a rotational moment occurring in a belt guide in the fixing unit.

As shown in FIG. 5, by the sliding force F2 applied to the belt guide 431, a rotational moment M1 occurs in the belt guide 431. The rotational moment M1 acts in a direction the same as the rotation direction of the fixing belt 42, i.e., in a counterclockwise direction in FIG. 5. In addition, when it is assumed that a radius of the belt guide 431 is L2, the rotational moment M1 is represented by $M1=F2\times L2$.

When the belt guide 431 rotates by the rotational moment M1 occurring in the belt guide 431, a part close to the pressure roller 44 among parts of the first frame part 400a is pushed by the first belt guide support part 401a. At the same time, a part separated from the pressure roller 44 among parts of the second frame part 400b is pushed by the second belt guide support part 401b. That is, a position of the belt guide 431 is determined in a state pushed by the first belt guide support part 401a and the second belt guide support part 401b due to the rotational moment M1.

Protrusion amounts of the first belt guide support part 401a and the second belt guide support part 401b are set so that the belt guide 431 is properly located in the state where the belt guide 431 is pushed by the first belt guide support part 401a and the second belt guide support part 401b.

In addition, the pressure lever 410 presses the belt guide 431 by interposing the roller 411 therebetween. At this time, since the roller 411 rotates, the rotation of the belt guide 431 is not obstructed by the pressure lever 410.

Figure 6:
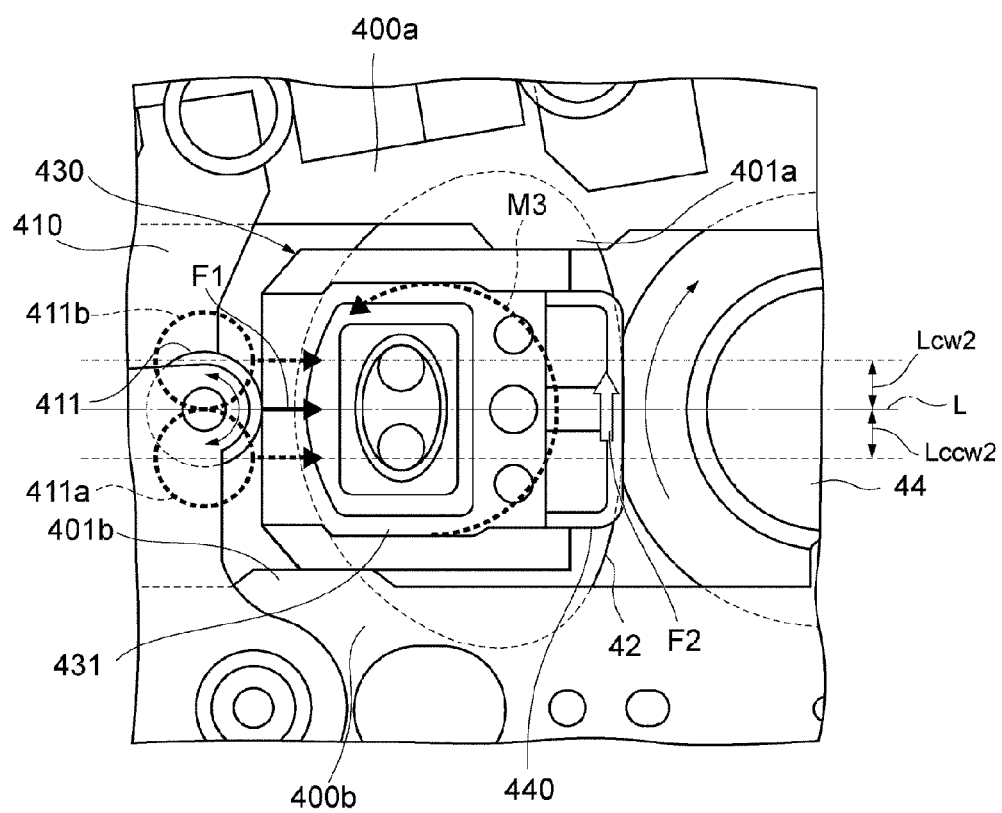
FIG. 6 is a partial front view of the fixing unit of FIG. 2 to describe a rotational moment occurring in the belt guide in the fixing unit.

A mounting position of the roller 411 will now be described in detail. As shown in FIG. 6, according to the mounting position of the roller 411, a rotational motion of the belt guide 431 due to the rotational moment M1 may be increased or obstructed. Herein, as shown in FIG. 6, a line in a direction orthogonal to the sliding direction of the belt guide 431 (that is, in a direction where the pressure-contacting member 440 pressure-contacts the pressure roller 44) is referred to as a central line L.

When the roller 411 presses a position on the central line L of the belt guide 431, the pressure force F1 of the roller 411 added to the belt guide 431 does not contribute to an increase or decrease in the rotational moment M1 occurring in the belt guide 431. That is, when a position at which the roller 411 presses the belt guide 431 and a rotational moment according to the rotation of the fixing belt 42 are considered, a rotational moment M3 of the belt guide 431 becomes the rotational moment M1 described above.

A case where the roller 411 presses a position biased towards the second frame part 400b based on the central line L of the belt guide 431 will now be described. Hereinafter, the roller 411, which presses a position biased towards the second frame part 400b based on the central line L of the belt guide 431, is indicated as a roller 411a (in FIG. 6, the roller 411a is represented as a dashed line). When the roller 411a is mounted in a position biased towards the second frame part 400b based on the central line L of the belt guide 431 (the roller 411a is at an upstream side with respect to the central line L based on the rotation direction of the pressure roller 44 when seeing it in the direction parallel to the rotation axis of the pressure roller 44), a rotational moment M2a occurs in the belt guide 431 by the pressure force F1 of the roller 411a applied to the belt guide 431. The rotational moment M2a is in a counterclockwise direction (left direction) in FIG. 6, i.e., in a direction the same as the rotation direction of the fixing belt 42.

If it is assumed that a radius of moment of the belt guide 431 due to the pressure force F1 by the roller 411a is Lccw2, the rotational moment M2a is represented by $M2a=F1\times Lccw2$.

Accordingly, when a position at which the roller 411a presses the belt guide 431 and the rotational moment according to the rotation of the fixing belt 42 are considered, the rotational moment M3 of the belt guide 431 caused by the pressure force F1 is represented by $M3=M1+F1\times Lccw2$.

That is, the rotational moment M1 occurring in the belt guide 431 according to the rotation of the fixing belt 42 is increased by the pressure force F1 of the roller 411a. Accordingly, a force pushing the belt guide 431 toward the first belt guide support part 401a and the second belt guide support part 401b is increased, and a position of the belt guide 431 may be certainly determined.

A case where the roller 411 presses a position biased towards the first frame part 400a based on the central line L of the belt guide 431 will now be described. Hereinafter, the roller 411, which presses a position biased towards the first frame part 400a based on the central line L of the belt guide 431, is indicated as a roller 411b (in FIG. 6, the roller 411b is represented as a dashed line). When the roller 411b is mounted in a position biased towards the first frame part 400a based on the central line L of the belt guide 431 (the roller 411b is at a downstream side of the central line L based on the rotation direction of the pressure roller 44 when seeing it in the direction parallel to the rotation axis of the pressure roller 44), a rotational moment M2b occurs in the belt guide 431 by the pressure force F1 of the roller 411b applied to the belt guide 431. The rotational moment M2b is in a clockwise direction (right direction) in FIG. 6, i.e., in a direction that is opposite to the rotation direction of the fixing belt 42).

If it is assumed that a radius of the moment of the belt guide 431 due to the pressure force F1 of the roller 411b is Lcw2, the rotational moment M2b is represented by $M2b=F1\times Lcw2$.

Accordingly, when a position at which the roller 411b presses the belt guide 431 and the rotational moment according to the rotation of the fixing belt 42 are considered, the rotational moment M3 of the belt guide 431 is represented by $M3=M1-F1\times Lcw2$.

That is, the rotational moment M1 occurring in the belt guide 431 according to the rotation of the fixing belt 42 is decreased by the pressure force F1 of the roller 411b. Accordingly, a force pushing the belt guide 431 toward the first belt guide support part 401a and the second belt guide support part 401b is decreased, and a position of the belt guide 431 may not be certainly determined. Thus, the roller 411 is preferably mounted on the central line L or a position biased towards the second frame part 400b based on the central line L so that the rotational moment M1 according to the rotation of the fixing belt 42 is not decreased. However, only if the pressure force F1 by the roller 411 does not obstruct a rotational motion of the belt guide 431 due to the rotational moment M1, the roller 411 may be mounted on a position biased towards the first frame part 400a based on the central line L.

According to an embodiment of the fixing unit 40, when the pressure roller 44 rotates by an operation start of the fixing unit 40, the pressure-contacting member 440 pressure-contacting the pressure roller 44 is also moved according to rotational movement of an outer circumferential surface of the pressure roller 44. That is, a rotational moment occurs in the belt guide 431. Accordingly, an end of the belt guide 431 opposing the pressure roller 44 moves towards the first frame part 400a disposed at a downstream side in a rotation direction of the pressure roller 44 and contacts the first belt guide support part 401a. The other end of the belt guide 431 apart from the pressure roller 44 moves towards the second frame part 400b disposed at an upstream side in the rotation direction of the pressure roller 44 and contacts the second belt guide support part 401b.

As described above, by rotating the pressure roller 44 of the fixing unit 40, the belt guide 431 is pushed toward the first belt guide support part 401a and the second belt guide support part 401b to thereby stably support the belt guide 431 by the first belt guide support part 401a and the second belt guide support part 401b. Accordingly, a stable operation of the fixing belt 42 is possible.

In addition, since a portion except for the first belt guide support part 401a in a surface of the first frame part 400a towards the second belt guide support part 401b and a portion except for the second belt guide support part 401b in a surface of the second frame part 400b towards the first frame part 400a do not contribute to supporting the belt guide 431, a gap therebetween may be wide. Accordingly, a work for disposing the belt guide 431 between the first frame part 400a and the second frame part 400b is easy, and the assembly performance of the belt guide 431 is improved.

By pressing the belt guide 431 using the roller 411, the rotational moment M1 occurring in the belt guide 431 by the rotation of the fixing belt 42 is not obstructed by a contact with the roller 411. Thus, even when the belt guide 431 is pressed by the pressure lever 410, the belt guide 431 may certainly contact the first belt guide support part 401a and the second belt guide support part 401b by the rotational moment M1.

The roller 411 is preferably mounted at an upstream side in the rotation direction of the pressure roller 44 based on the central line L passing through the center of a width direction of the belt guide 431. In this case, the pressure force F1 applied to the belt guide 431 by the roller 411 much more increases the rotational moment M1 occurring in the belt guide 431 according to the rotation of the pressure roller 44. Accordingly, the belt guide 431 may more certainly contact the first belt guide support part 401a and the second belt guide support part 401b.

Although an embodiment has been described, embodiments are not limited thereto. For example, although the first frame part 400a and the second frame part 400b are molded in one body in the above-described embodiment, the first frame part 400a and the second frame part 400b may be separate members from each other.

In addition, the tandem-type image forming apparatus 1 shown in FIG. 1 is an example of an image forming apparatus using the fixing unit 40 according to the current embodiment, and the fixing unit 40 according to the current embodiment may be applied to image forming apparatuses of various types. In addition, examples of an image forming apparatus may be a printer, a FAX machine, a copy machine, and the like.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A fixing device comprising:
   a pressure roller;
   an endless-shaped fixing belt having flexibility;
   a pressure-contacting member to pressure-contact the pressure roller by interposing the fixing belt therebetween;
   a belt guide to rotatably support the fixing belt and to simultaneously support the pressure-contacting member; and
   first and second frames to support the belt guide by interposing the belt guide therebetween,
   wherein the first and second frames slidably support the belt guide in a direction where the pressure-contacting member pressure-contacts the pressure roller,
   wherein the first frame is disposed at a downstream side of the second frame in a rotation direction of the pressure roller when viewing the configuration of the first frame and the second frame in a direction parallel to a rotation axis of the pressure roller,
   wherein a convex-shaped first belt guide support part to support the belt guide is provided on a surface of the first frame, which faces the second frame, and
   wherein a convex-shaped second belt guide support part to support the belt guide is provided on a surface of the second frame, which faces the first frame, at a position, which is more separated from the pressure roller than the first belt guide support part.

2. The fixing device of claim 1, further comprising a pressure member to press the belt guide so that pressure-contacting member pressure-contacts the pressure roller,
   wherein the pressure member presses the belt guide by a roller having a rotation axis that is parallel to the rotation axis of the pressure roller.

3. The fixing device of claim 2, wherein the roller is mounted at an upstream side in the rotation direction of the pressure roller based on a central line of a width of the belt guide in a direction that is orthogonal to a sliding direction of the belt guide when viewing the configuration of the roller and the pressure roller in a direction parallel to the rotation axis of the pressure roller.

4. A fixing device comprising:
   a pressure roller;
   a fixing belt;
   a pressure-contacting member to pressure contact the pressure roller by interposing the fixing belt therebetween;
   a belt guide to rotatably support both ends of the fixing belt and to simultaneously support the pressure-contacting member;
   first and second frame parts, which are respectively located at a downstream side and an upstream side based on a rotation direction of the pressure roller, which face each other, and which support the belt guide therebetween to be slidable towards the pressure roller; and
   a pressure member to apply a pressure force to the belt guide in a direction where the pressure-contacting member pressure-contacts the pressure roller,
   wherein the pressure member applies the pressure force to a position biased towards the second frame part based on a central line passing through the center of a width of the pressure-contacting member.

5. The fixing device of claim 4, wherein convex-shaped first and second belt guide support parts which support the belt guide are located on surfaces of the first and second frame parts, which face each other.

6. The fixing device of claim 5, wherein the first and second belt guide support parts have different separation distances from the pressure roller.

7. The fixing device of claim 6, wherein the first belt guide support part is closer to the pressure roller than the second belt guide support part.

8. The fixing device of claim 4, wherein the pressure member has a roller having a rotation axis that is parallel to a rotation axis of the pressure roller, and the roller contacts and presses the belt guide.

9. An image forming apparatus comprising:
at least one developing unit to apply a toner image to a transfer unit, which transfers the toner image to a medium; and
a fixing device to fix the toner image to the medium, the fixing device comprising:
a pressure roller;
an endless-shaped fixing belt having flexibility;
a pressure-contacting member to pressure-contact the pressure roller by interposing the fixing belt therebetween;
a belt guide to rotatably support the fixing belt and to simultaneously support the pressure-contacting member; and
first and second frames to support the belt guide by interposing the belt guide therebetween,
wherein the first and second frames slidably support the belt guide in a direction where the pressure-contacting member pressure-contacts the pressure roller,
wherein the first frame is disposed at a downstream side of the second frame in a rotation direction of the pressure roller when viewing the configuration of the first frame and the second frame in a direction parallel to a rotation axis of the pressure roller,
wherein a convex-shaped first belt guide support part to support the belt guide is provided on a surface of the first frame, which faces the second frame, and
wherein a convex-shaped second belt guide support part to support the belt guide is provided on a surface of the second frame, which faces the first frame, at a position, which is more separated from the pressure roller than the first belt guide support part.

10. The image forming apparatus of claim 9, further comprising a pressure member to press the belt guide so that pressure-contacting member pressure-contacts the pressure roller,
wherein the pressure member presses the belt guide by a roller having a rotation axis that is parallel to the rotation axis of the pressure roller.

11. The image forming apparatus of claim 10, wherein the roller is mounted at an upstream side in the rotation direction of the pressure roller based on a central line of a width of the belt guide in a direction that is orthogonal to a sliding direction of the belt guide when viewing the configuration of the roller and the pressure roller in a direction parallel to the rotation axis of the pressure roller.

* * * * *